(12) United States Patent
Kang

(10) Patent No.: US 12,512,080 B2
(45) Date of Patent: Dec. 30, 2025

(54) DISPLAY DRIVER INTEGRATED CIRCUIT AND CONTROL METHOD THEREOF

(71) Applicant: Beijing ESWIN Computing Technology Co., Ltd., Beijing (CN)

(72) Inventor: Steven Kang, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 435 days.

(21) Appl. No.: 18/146,455

(22) Filed: Dec. 26, 2022

(65) Prior Publication Data

US 2024/0071332 A1    Feb. 29, 2024

(30) Foreign Application Priority Data

Aug. 24, 2022   (CN) .......................... 202211020319.1

(51) Int. Cl.
  *G09G 5/00*      (2006.01)
  *G11C 5/02*      (2006.01)
  *G11C 5/06*      (2006.01)

(52) U.S. Cl.
  CPC .............. *G09G 5/003* (2013.01); *G11C 5/025* (2013.01); *G09G 2300/0857* (2013.01); *G09G 2310/0286* (2013.01); *G11C 5/066* (2013.01)

(58) Field of Classification Search
  CPC ........... G09G 5/003; G09G 2300/0857; G09G 2310/0286; G09G 2300/0408; G09G 2370/08; G09G 3/2092; G09G 3/20; G11C 5/025; G11C 5/066; G06F 30/3947
  USPC .......................................................... 345/544
  See application file for complete search history.

(56) References Cited

U.S. PATENT DOCUMENTS

| 2004/0158675 | A1* | 8/2004 | Hirose | G06F 11/141 |
| | | | | 714/E11.085 |
| 2005/0240643 | A1* | 10/2005 | Goto | G06F 17/147 |
| | | | | 708/402 |
| 2011/0074795 | A1* | 3/2011 | Li | G09G 3/3685 |
| | | | | 345/100 |
| 2022/0343966 | A1* | 10/2022 | Lee | G11C 11/4085 |

FOREIGN PATENT DOCUMENTS

| CN | 102270423 B | 4/2017 |
| CN | 108280317 A | 7/2018 |

* cited by examiner

*Primary Examiner* — James A Thompson
*Assistant Examiner* — Kim Tranh T Tran

(57) ABSTRACT

The present application discloses a display driver integrated circuit and a control method thereof, relating to the technical field of display. An object of the present application mainly lies in that the display driver integrated circuit includes: a bus, a static random-access memory divided into a plurality of memory areas, and a plurality of transmission lines connected to the bus; wherein each of the memory areas includes at least two memory blocks; each of the transmission lines is respectively connected to a plurality of memory blocks in a corresponding manner, and the memory blocks connected to each of the transmission lines are not repeated.

19 Claims, 7 Drawing Sheets

--- traversing the memory blocks in the static random-access memory based on a second ordering when a line of pixels to be displayed needs to be scanned, wherein the number of consecutive orderings of the memory blocks belonging to the same memory area in the second ordering is not greater than a second number, and the second number is a positive integer greater than or equal to 1   ⟶ 301 performing a data reading operation on the currently traversed memory blocks, so that the currently traversed memory blocks transmit stored image data to correspondingly connected transmission lines   ⟶ 302 traversing the memory blocks in the static random-access memory based on a second ordering when a line of pixels to be displayed needs to be scanned, wherein the number of consecutive orderings of the memory blocks belonging to the same memory area in the second ordering is not greater than a second number, and the second number is a positive integer greater than or equal to 1 — 301 performing a data reading operation on the currently traversed memory blocks, so that the currently traversed memory blocks transmit stored image data to correspondingly connected transmission lines — 302

FIG. 11

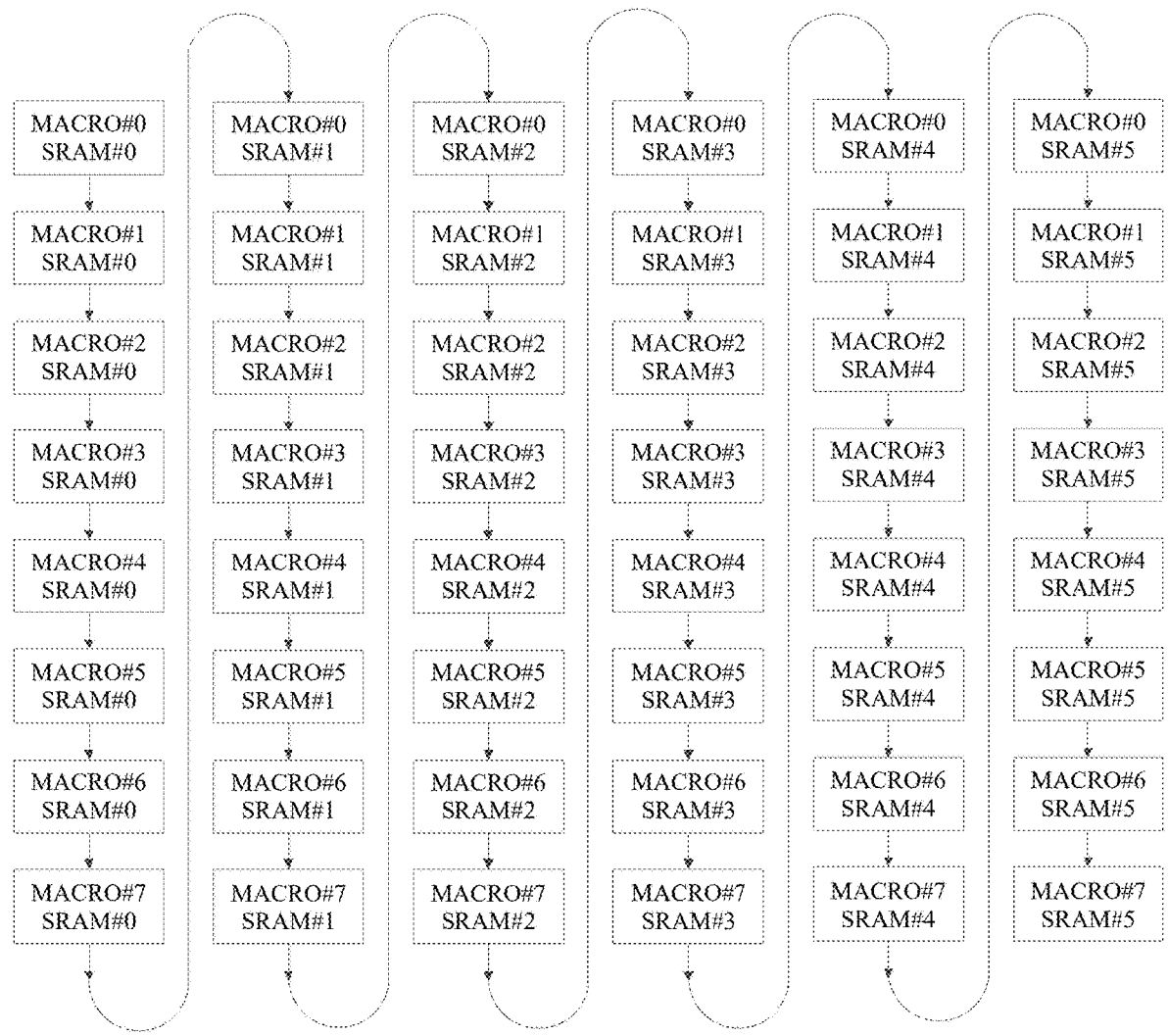

FIG. 12

DISPLAY DRIVER INTEGRATED CIRCUIT AND CONTROL METHOD THEREOF

CROSS REFERENCE TO RELATED APPLICATION

This application claims priority to Chinese Patent Application No. CN2022110203191, titled "Display Driver Integrated Circuit and Control Method Thereof" and filed to the State Patent Intellectual Property Office on the entire contents of which are incorporated herein by reference.

TECHNICAL FIELD

The present application relates to the technical field of display, in particular to a display driver integrated circuit and a control method thereof.

BACKGROUND ART

A display driver integrated circuit (DDIC) is an integrated circuit for driving a display apparatus such as a liquid crystal display (LCD), a light emitting diode (LED), and an organic light emitting diode (OLED). A frame memory is provided in the display driver integrated circuit. The frame memory is used for storing image data transmitted by a host at a certain speed, and when the display apparatus needs to display, the stored image data thereof is read and output to a pixel unit of the display apparatus for pixel unit display.

At present, a static random-access memory is often chosen as the frame memory. Although the static random-access memory can output image data at a drive frequency above 60 Hz, the capacity of the static random-access memory is related to its physical size, and the capacity of the static random-access memory selected is limited by the size of the placement area for which the display driver integrated circuit resides.

It can be seen that the size of the placement area of the display driver integrated circuit which is left for the static random-access memory is related to which capacity of the static random-access memory is selected. Therefore, how to optimize the wiring structure of a display driver integrated circuit so as to apply a static random-access memory with a capacity as large as possible in a limited space is a technical problem urgently needed to be solved by a person skilled in the art.

SUMMARY OF THE INVENTION

In view of this, the present application provides a display driver integrated circuit and a control method thereof. An object of the present application is mainly to optimize a wiring structure of the display driver integrated circuit to apply static random-access memory with as large capacity as possible in a limited space.

In order to achieve the above-mentioned object, the present application mainly provides the following technical solutions:

in a first aspect, the present application provides a display driver integrated circuit including: a bus, a static random-access memory divided into a plurality of memory areas, and a plurality of transmission lines connected to the bus; wherein each of the memory areas includes at least two memory blocks; each of the transmission lines is respectively connected to a plurality of memory blocks in a corresponding manner, and the memory blocks connected to each of the transmission lines are not repeated.

In some embodiments, the transmission lines are turned on when the memory blocks connected thereto need to output image data, and transmit the image data to the bus, and are turned off when the memory blocks connected thereto do not need to output image data; and the bus is used for performing transmission processing on the image data.

In some embodiments, the transmission line includes a switch module and a first controller; wherein an input end of the switch module is connected to a corresponding memory block, an output end is connected to the bus, and a control end is connected to the first controller; the first controller is used for transmitting a turning-on signal to the switch module when a memory block connected to the input end needs to output image data; and transmitting a turning-off signal to the switch module when the memory blocks connected to the input end do not need to output image data; and the switch module is used for turning on under the condition of the turning-on signal, and turning off under the condition of the turning-off signal.

In some embodiments, the switch module is a tri-state buffer or an MOS tube.

In some embodiments, the total amount of the transmission lines is a first number, and each of the memory areas includes the first number of memory blocks; the memory blocks in the same memory area have a first ordering; the memory blocks having the same ordering position in the first ordering corresponding to each of the memory areas are correspondingly connected to the same transmission line; wherein the first ordering describes the order of output image data of each of the memory blocks in a corresponding memory area.

In some embodiments, the number of the transmission lines is the same as the total number of the memory areas; the memory blocks in the same memory area are correspondingly connected to the same transmission lines, and different memory areas correspond to different transmission lines.

In some embodiments, the display driver integrated circuit further includes a processing module and a shift register; wherein the processing module is used for receiving image data transmitted by the bus, processing the image data, and transmitting the processed data to the shift register; and the shift register is used for storing the processed data based on the display timing of the image data at the corresponding pixel unit.

In a second aspect, the present application provides a control method of a display driver integrated circuit, as applied to the display driver integrated circuit of the first aspect, the method including: when it is necessary to scan a pixel line to be displayed, traversing the memory blocks in the static random-access memory based on a second ordering, and performing a data reading operation on the currently traversed memory blocks, so that the currently traversed memory blocks transmit stored image data to correspondingly connected transmission lines;

wherein the number of consecutive orderings of the memory blocks belonging to the same memory area in the second ordering is not greater than a second number, and the second number is a positive integer greater than or equal to 1.

In some embodiments, the method further includes: when image data storage needs to be performed on a pixel line to be displayed, traversing the memory blocks in the static random-access memory based on the second ordering, and performing a data write operation on the currently traversed memory blocks, so that the currently traversed memory blocks correspondingly store the written image data.

In some embodiments, in the case where the second number is 1 and the memory blocks in the same memory area have a target ordering, the second ordering is formed by concatenating a plurality of third orderings; all the third orderings cover all the memory blocks in the static random-access memory, and the memory blocks in different third orderings are not repeated; each of the third orderings is respectively composed of memory blocks having the same ordering position in the target ordering corresponding to each of the memory areas, and the memory blocks involved in the third orderings are ordered according to the traversal order of each of the memory areas.

In some embodiments, in the case where the second number is greater than 1, the second ordering is used for med by concatenating a plurality of fourth orderings, all the fourth orderings cover all the memory blocks in the static random-access memory, and the memory blocks in different fourth orderings are not repeated; each of the fourth orderings is respectively used for defining a traversal order of a plurality of memory blocks; wherein the plurality of memory blocks relate to all memory areas of the static random-access memory, the plurality of memory blocks are ordered according to a traversal order of each of the memory areas, and the memory blocks belonging to the same memory area are ordered successively, and the total number of the memory blocks belonging to the same memory area is not greater than the second number.

In a third aspect, the present application provides a frame memory controller applied to a display driver integrated circuit, wherein the frame memory controller applies the control method of the display driver integrated circuit according to the second aspect.

In a fourth aspect, the present application provides a display apparatus including: a display driver integrated circuit according to the first aspect and a frame memory controller applied to the display driver integrated circuit according to the third aspect.

The present application provides a display driver integrated circuit and a control method thereof, wherein the display driver integrated circuit includes a bus, a static random-access memory divided into a plurality of memory areas, and a plurality of transmission lines connected to the bus. Each memory area is divided into at least two memory blocks. Each transmission line is respectively connected to a plurality of memory blocks in a corresponding manner, and the memory blocks connected to each transmission line are not repeated. It can be seen that the embodiments of the present application have at least the following two beneficial effects: firstly, by means that each transmission line is respectively connected to a plurality of memory blocks in a corresponding manner, and all the transmission lines are connected to a bus, not only multiple memory blocks reuse the same transmission line, but also all the transmission lines reuse the same bus, and therefore the solution provided in the present application can reduce the number of lines in a display driver integrated circuit, optimize the wiring structure of the display driver integrated circuit, and can leave a sufficient placement area for a static random-access memory. Secondly, the static random-access memory is divided into a plurality of memory areas, and each memory area is divided into at least two memory blocks, so that the writing and outputting of image data in units of memory blocks can be realized, and the writing and outputting speed of image data can be improved.

The above description is merely an overview of the technical solution of the present application, which can be implemented according to the contents of the description in order to enable the technical means of the present application to be more clearly understood, and in order to enable the above and other objects, features and advantages of the present application to be more clearly understood, particular embodiments of the present application are set forth below.

BRIEF DESCRIPTION OF THE DRAWINGS

In order to explain the embodiments of the present application or the technical solutions in the prior art more clearly, the following will briefly introduce the drawings which need to be used in the embodiments or the description of the prior art; obviously, the drawings in the following description are some embodiments of the present application, and it would have been obvious for a person of ordinary skill in the art to obtain other drawings according to these drawings without involving any inventive effort.

FIG. 11 is a flowchart illustrating a control method of a display driver integrated circuit according to an embodiment of the present application;

FIG. 12 illustrates a schematic diagram of a data output ordering according to an embodiment of the present application.

DETAILED DESCRIPTION OF THE INVENTION

Exemplary embodiments of the present disclosure will be described in more detail below with reference to the accompanying drawings. While the drawings show exemplary embodiments of the present disclosure, it should be understood that the present disclosure may be embodied in various forms and should not be construed as limited to the embodiments set forth herein. Rather, these embodiments are provided so that this disclosure will be thorough and complete, and will fully convey the scope of the disclosure to a person skilled in the art.

A display driver integrated circuit is an integrated circuit for driving a display apparatus such as an LCD, an LED and an OLED. A frame memory is provided in the display driver integrated circuit. The frame memory is used for storing image data transmitted by the host at a certain speed, and outputting the image data to the pixel unit of the display apparatus for the pixel unit display when the display apparatus needs to display.

Figure 1:
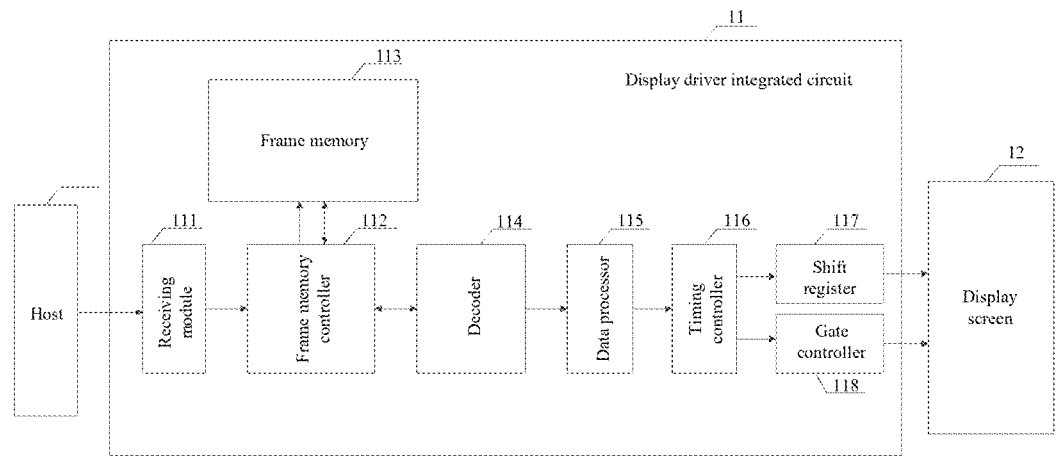
FIG. 1 shows a schematic diagram of a display driver integrated circuit according to an embodiment of the present application.

The structure of the display driver integrated circuit is specifically described below by taking FIG. 1 as an example: included in FIG. 1 are a host 10, a display driver integrated circuit 11, and a display screen 12. The display driver integrated circuit 11 includes a receiving module 111, a frame memory controller 112, a frame memory 113, a decoder 114, a data processor 115, a timing controller 116, a shift register 117, and a gate controller 118. The host 10 transmits image data to the receiving module 111 at a certain speed through the Mobile Industry Processor Interface Receiver (MIPI TX) module. The receiving module 111 receives image data through Mobile Industry Processor Interface (MIPI) and transmits the image data to the frame memory controller 112. The frame memory controller 112 writes image data into the frame memory 113. The frame memory 113 stores image data written by the frame memory controller 112. The frame memory controller 112, when acquiring a row address of a row of pixels to be displayed, reads image data corresponding to the row address from the frame memory 113, and transmits the read image data to the decoder 114. The decoder 114 performs decoding processing on the image data, and transmits the decoded image data to the data processor 115. The image processor 115 processes the received image data to restore image quality or the like, and transmits the processed image data to the timing controller 116. The timing controller 116 generates a clock for the image data and transmits same to the shift register 117. The shift register 117 stores the image data based on its clock. The gate controller 118 drives the pixel unit in the display screen 12 according to a clock, the shift register 117 transmits image data to the pixel unit in the display screen 12 based on the clock, and the pixel unit displays based on the image data transmitted by the shift register 117 and the driving of the gate controller 118.

The frame memory 113 of FIG. 1 may be selected from dynamic random-access memory or static random-access memory.

Figure 2:
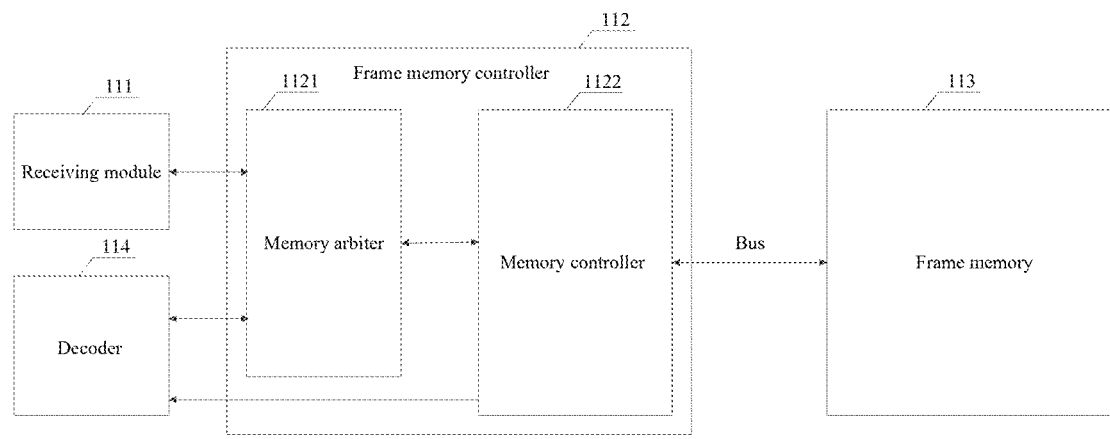
FIG. 2 shows a schematic diagram of a display driver integrated circuit with a dynamic random-access memory as a frame memory according to an embodiment of the present application.
Figure 3:
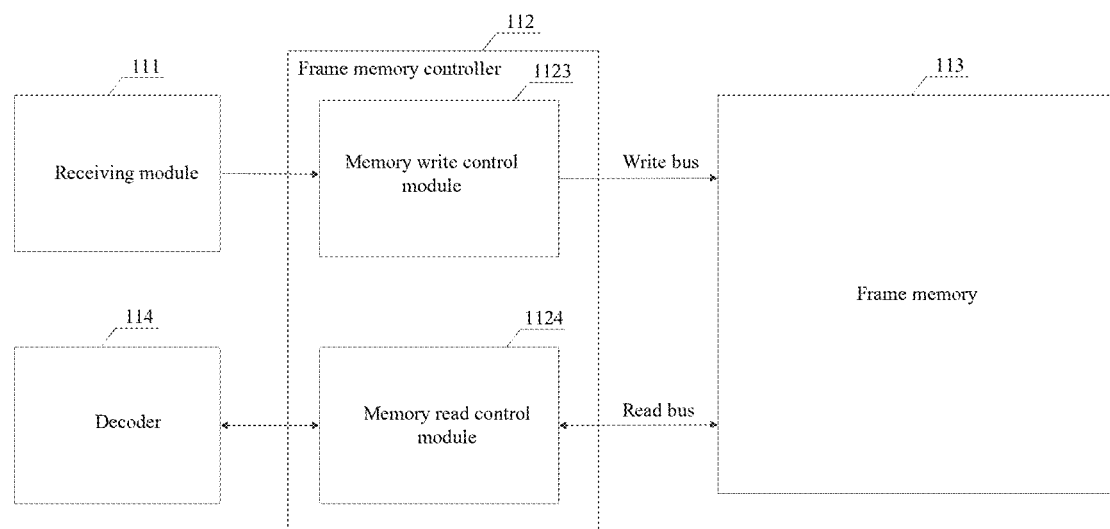
FIG. 3 shows a schematic diagram of a display driver integrated circuit using a static random-access memory as a frame memory according to an embodiment of the present application.

A case where dynamic random-access memory is selected as the frame memory 113 will be described below. A dynamic random-access memory of the same capacity has a smaller area compared to a static random-access memory, and the area of the dynamic random-access memory is more suitable for use in a space-constrained display driver integrated circuit. However, as shown in FIG. 2, when a dynamic random-access memory is used as a frame memory, the buses used for reading and writing the frame memory 113 are not separated, i.e., the reading and writing share the same bus, and a reading or writing operation is performed by accessing the frame memory 113 via the same bus; therefore, for a write request from a receiving module 111 and a read request from a decoder 114, a memory arbiter 1121 in the frame memory controller 112 needs to adjust the occupation right of the bus via a priority method, and then the storage controller 1122 accesses the frame memory 112 according to the arbitration result of the memory arbiter 1121. In this case, there may be a case where a read or write operation cannot be completed within a prescribed time. Due to the physical structure limitations of dynamic random-access memories, the above drawbacks can only be overcome by increasing the drive frequency. Since increasing the driving frequency not only increases the power consumption, but also a case where timing convergence is difficult may occur. At drive frequencies above 60 Hz, static random-access memories are more suitable as frame memories than dynamic random-access memories. A case where static random-access memory is selected as the frame memory 113 will be described below. As shown in FIG. 3, the frame memory controller 112 includes a memory write control module 1123 and a memory read controller 1124, wherein the memory write control module 1123 controls writing of the frame memory 113 through a write bus for a write request from the receiving module 111; the memory read control module 1124 controls reading of the frame memory 113 through a read bus for a read request from the decoder 114. It can be seen that when the static random-access memory is selected as the frame memory 113, reading and writing can be configured independently, which can also provide sufficient transmission bandwidth for image data output and writing at driving frequencies above 60 Hz. However, compared to dynamic random-access memory, the physical size of static random-access memory is significantly higher than dynamic random-access memory of the same capacity. In order to be able to deploy a static random-access memory having a relatively large physical size in a display driver integrated circuit, the wiring structure of the display driver integrated circuit needs to be optimized in order to leave sufficient placement space for the static random-access memory.

In order to be able to deploy the static random-access memory in a limited space, the embodiments of the present application provide a display driver integrated circuit to optimize the wiring structure of the display driver integrated circuit, to leave a large placement space for the static random-access memory as soon as possible to apply the static random-access memory with a capacity as large as possible in the limited space. In addition, the embodiments of the present application also provide a control method of a display driver integrated circuit so that the display driver integrated circuit after optimizing the wiring structure can improve the writing and outputting speed of image data when the image data is written and output in units of memory blocks.

Embodiments of the present application provide a display driver integrated circuit that optimizes a wiring structure to leave a placement area as large as possible for a static random-access memory. The display driver integrated circuit provided in the present application can be applied to a display apparatus such as an LCD, an LED, and an OLED, and specific types of display devices embodiments of the present application are not particularly limited, and illustratively, display devices are cell phones and tablet computers.

Figure 4:
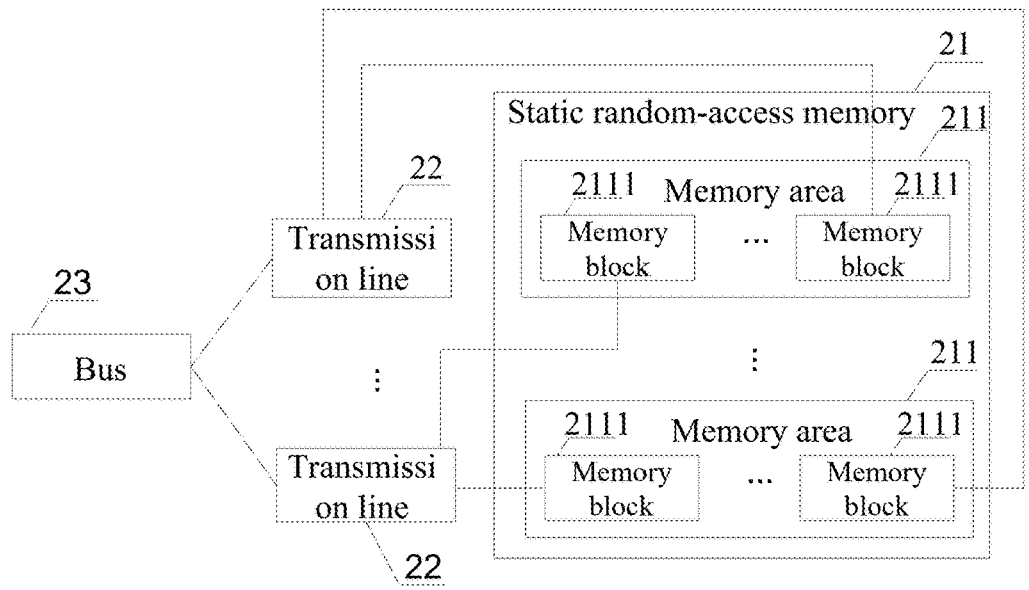
FIG. 4 shows a schematic diagram of a display driver integrated circuit according to another embodiment of the present application.

A display driver integrated circuit and a control method thereof according to an embodiment of the present application are specifically described below:

As shown in FIG. 4, an embodiment of the present application provides a display driver integrated circuit which mainly includes: a static random-access memory 21 divided into a plurality of memory areas 211, a plurality of transmission lines 22 connected to a bus 23, and the bus 23; wherein each memory area 211 includes at least two memory blocks 2111; each transmission line 22 is respectively connected to a plurality of memory blocks 2111 in a corresponding manner, and the memory blocks 2111 connected to each transmission line 22 are not repeated.

The specific structure and interaction relationship of each component involved in the display driver integrated circuit are specifically described below:

static random-access memory 21:
the static random-access memory 21 is used as a frame memory 113 in the display driver integrated circuit shown in FIG. 1. The static random-access memory 21 is used to store image data written by the frame memory controller 112 and to output the image data to pixel units of the display apparatus for pixel unit display when the display apparatus needs to display.

The static random-access memory 21 is divided into a plurality of memory areas 211, each memory area is divided into at least two memory blocks 2111, and each of the memory blocks 2111 has a corresponding physical memory structure in the static random-access memory 21. The above-mentioned division manner of the static random-access memory 21 enables the static random-access memory 21 to store or output image data in units of a memory block 2111, which occupies a smaller physical memory structure and can increase the speed of storing or outputting image data when storing or outputting image data.

The number of the memory areas 211 into which the static random-access memory 21 is divided and the number of the memory blocks 2111 into which each of the memory areas 211 is divided may be determined based on service requirements. Illustratively, the setting principle of the number of memory blocks 2111 included in the static random-access memory 21 is: the number of memory blocks 2111 can store the entire image data required for one line of pixel unit display. The static random-access memory 21 can write or output a row of pixel units at a time to display desired image data.

Transmission line 22:
the number of transmission lines 22 is plural, and all the transmission lines 22 are connected to the bus 23. Each transmission line 22 is respectively connected to a plurality of memory blocks 2111 in the static random-access memory 21 in a corresponding manner, and the memory blocks 2111 connected to each transmission line 22 are not repeated. In order to optimize the wiring structure of the display driver integrated circuit, an arrangement space as large as possible is left for the static random-access memory 21 in which a plurality of memory blocks 2111 share one transmission line 22 to reduce the number of transmission lines 22 used.

There are two connection relationships between the transmission line 22 and the memory block 2111 in the static random-access memory 21:

firstly, the total number of transmission lines 22 is a first number, and each of the memory areas 211 includes a first number of memory blocks 2111 therein. The memory blocks 2111 within the same memory area 211 have a first ordering. The memory blocks 2111 having the same ordering position in the first ordering corresponding to each memory area 211 are correspondingly connected to the same transmission line 22. The first ordering describes the order of the output image data of each of the memory blocks 2111 in the corresponding memory area 211.

Note that the first ordering defines an order of the output image data of each of the memory blocks 2111 within the same memory area 211, not the order of the output image data of all the memory blocks 2111 in the static random-access memory 21. Since the number of memory blocks 2111 included in each memory area 211 is the same, there are memory blocks 2111 having the same ordering position in the first ordering corresponding to each memory area 211. In order to reduce the number of wirings, the memory blocks 2111 having the same ordering position in the first ordering corresponding to each memory area 211 multiplex the same transmission line 22.

Figure 5:
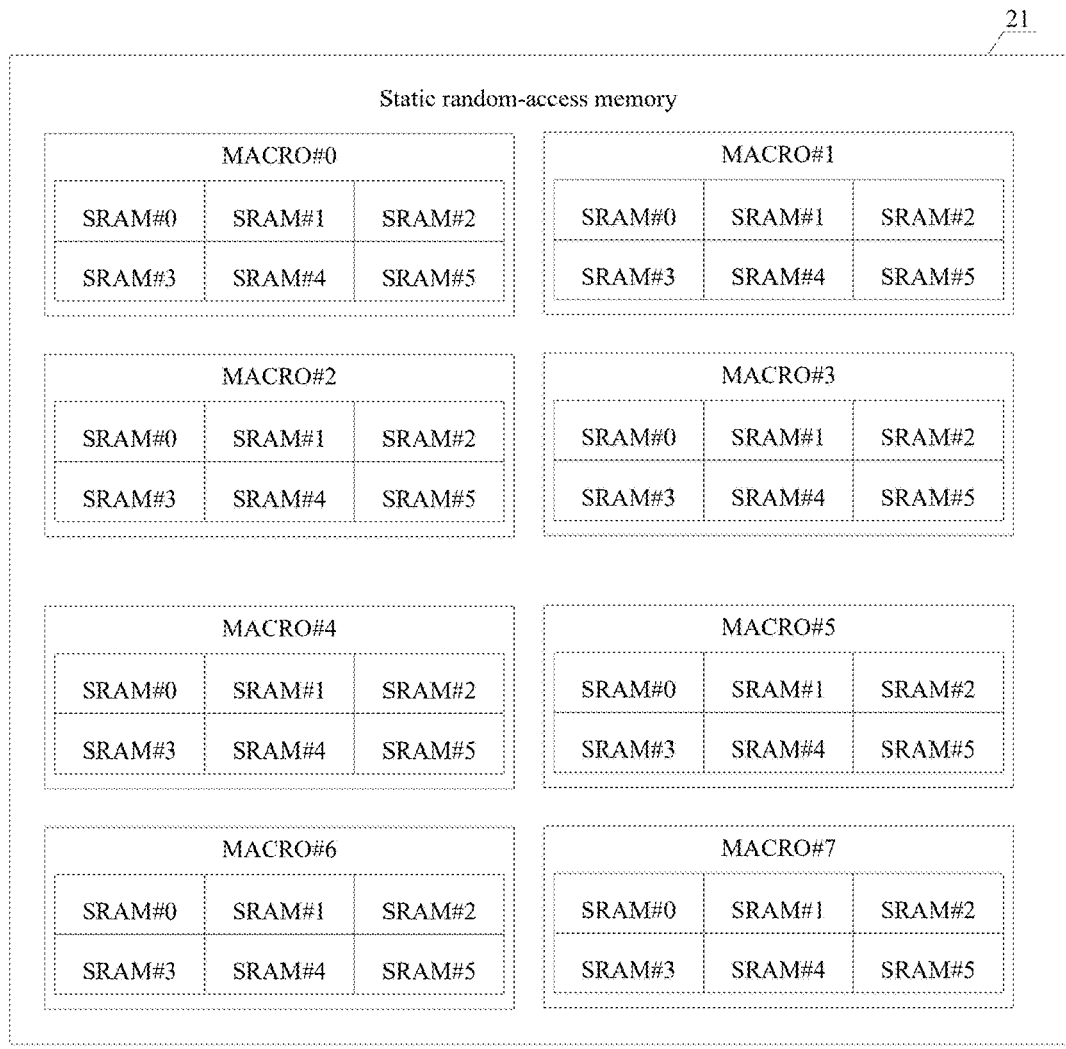
FIG. 5 shows a schematic diagram of memory area and memory block partitioning for a static random-access memory according to an embodiment of the present application.

Illustratively, as shown in FIG. 5, the static random-access memory 21 is divided into eight memory areas 211, and the eight memory areas 211 are respectively: MACRO #0, MACRO #1, MACRO #2, MACRO #3, MACRO #4, MACRO #5, MACRO #6, and MACRO #7. Each memory area 211 is divided into six memory blocks 2111, and the six memory blocks 2111 are respectively: SRAM #0, SRAM #1, SRAM #2, SRAM #3, SRAM #4, and SRAM #5. The memory blocks 2111 in each memory area 211 all have the same first ordering, and the order of each of the memory blocks 2111 in the first ordering is: SRAM #0, SRAM #1, SRAM #2, SRAM #3, SRAM #4, and SRAM #5. For any memory area 211, the first ordering describes the order in which the internal memory block 2111 outputs image data, that is to say, SRAM #0, SRAM #1, SRAM #2, SRAM #3, SRAM #4 and SRAM #5 sequentially output corresponding image data.

Figure 6:
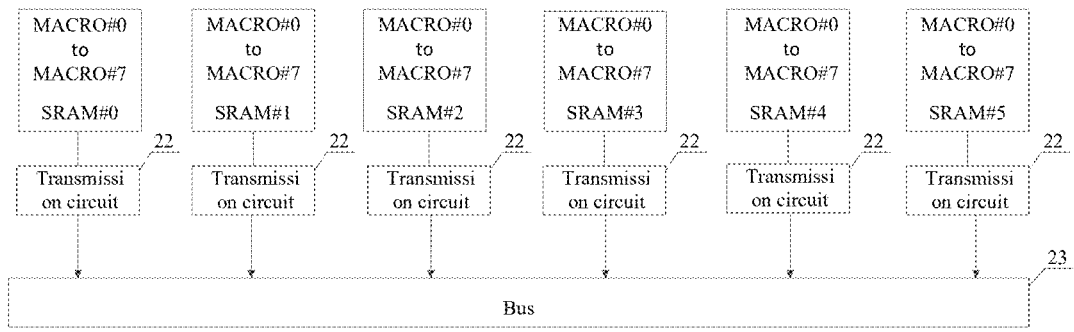
FIG. 6 is a schematic diagram showing a connection relationship among a transmission line, a bus and a memory block according to an embodiment of the present application.

Illustratively, the number of transmission lines 22 is the same as the number of memory blocks 2111 in the memory area 211, which is six. In order to reduce the number of wirings, the embodiment of the present application uses a multiplexing wiring scheme, and therefore each memory area 211 corresponds to a memory block 2111 having the same ordering position in the first ordering, and is correspondingly connected to the same transmission line 22. As shown in FIG. 6, the SRAM #0 in each of the memory areas 211 in FIG. 5 is located at the first position in the corresponding first ordering, so that the SRAM #0 in each of the memory areas 211 "MACRO #0 to MACRO #7" is connected to the same transmission line 22. As another example, in FIG. 5, the SRAM #1 in each of the memory areas 211 is located at the second position in the corresponding first ordering, so that the SRAM #1 in each of the memory areas 211 "MACRO #0 to MACRO #7" is connected to the same transmission line 22. As another example, in FIG. 5, the SRAM #2 in each of the memory areas 211 is located at the third position in the corresponding first ordering, so that the SRAM #2 in each of the memory areas 211 "MACRO #0 to MACRO #7" is connected to the same transmission line 22. As another example, in FIG. 5, the SRAM #3 in each of the memory areas 211 is located at the fourth position in the corresponding first ordering, so that the SRAM #3 in each of the memory areas 211 "MACRO #0 to MACRO #7" is connected to the same transmission line 22. As another example, in FIG. 5, the SRAM #4 in each of the memory areas 211 is located at the fifth position in the corresponding first ordering, so that the SRAM #4 in each of the memory areas 211 "MACRO #0 to MACRO #7" is connected to the same transmission line 22. As another example, in FIG. 5, the SRAM #5 in each of the memory areas 211 is located at the sixth position in the corresponding first ordering, so that the SRAM #5 in each of the memory areas 211 "MACRO #0 to MACRO #7" is connected to the same transmission line 22.

It should be noted that the first number may be determined based on service requirements, and the embodiments of the present application are not particularly limited. Illustratively, the first number is set on the principle that: it is ensured that the static random-access memory 21 includes the number of memory blocks 2111 capable of storing or outputting the entire image data required for the display of one row of pixel units.

Second, the number of transmission lines 22 is the same as the total number of memory areas 211 included in the static random-access memory 21. The memory blocks 2111 included in the same memory area 211 correspond to the same transmission line 22, and different memory areas 211 correspond to different transmission lines 22.

The number of transmission lines 22 is the same as the total number of memory areas 211 included in the static random-access memory 21, and in order to reduce the number of wiring, the embodiment of the present application uses a multiplexing wiring scheme, and therefore the memory blocks 2111 included in the same memory area 211 are correspondingly connected to the same transmission line 22.

Figure 7:
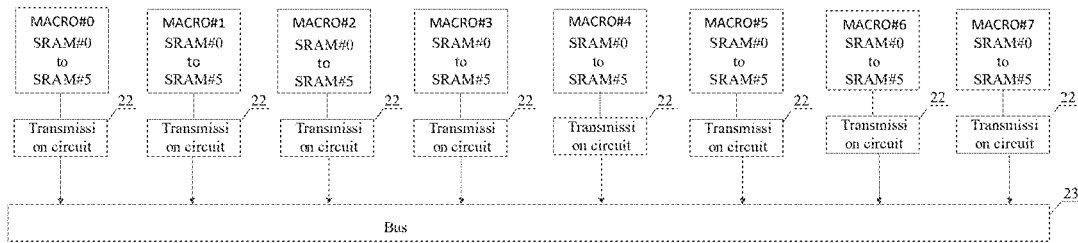
FIG. 7 is a schematic diagram showing a connection relationship among a transmission line, a bus and a memory block according to an embodiment of the present application.

Illustratively, as shown in FIG. 7, the memory area 211 is as shown in FIG. 5: in MACRO #0, MACRO #1, MACRO #2, MACRO #3, MACRO #4, MACRO #5, MACRO #6 and MACRO #7, the memory blocks 2111 included in the same memory area 211 are correspondingly connected to the same transmission line 22. For example, the memory block 2111 "SRAM #0 to SRAM #5" included in the memory area MACRO #0 corresponds to the same transmission line 22.

In order to further optimize the wiring structure of the display driver integrated circuit and reduce the number of wirings, all the transmission lines 12 are connected to the same bus 13.

Further, in order to prevent data transmission collisions in the bus 23, the transmission line 22 and the bus have the following actions: a transmission line 22 is turned on when the memory block 2111 connected thereto needs to output image data, and transmits the image data to the bus 23, and is turned off when the memory block 2111 connected thereto does not need to output image data. A bus 23 is used for performing transmission processing on the image data transmitted by the transmission line 22.

All the transmission lines 12 share the same bus 13, and the transmission lines 12 are turned on when the memory block 2111 connected thereto needs to output image data, and are turned off when the memory block 2111 connected thereto does not need to output image data, so that transmission collisions of image data transmitted by each transmission line 12 on the bus 23 can be avoided.

Figure 8:
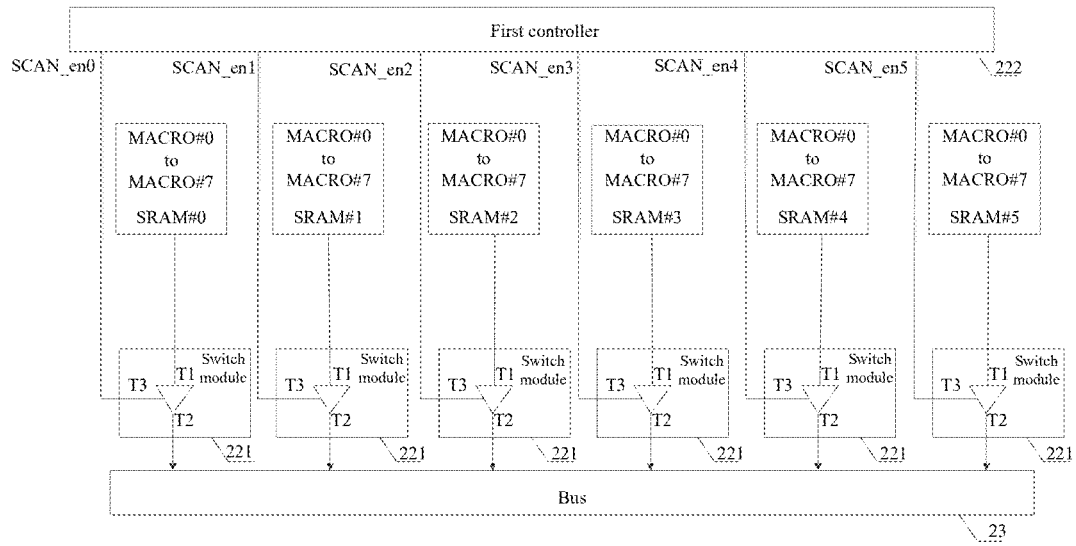
FIG. 8 is a schematic diagram showing a connection relationship among a transmission line, a bus and a memory block according to another embodiment of the present application.

In order to enable the transmission line 22 to be turned on or off according to the image data transmission of the memory block 211 to which it is connected, as shown in FIG. 8, the transmission line 22 includes a switch module 221 and a first controller 222. An input end T1 of the switch module 221 is connected to the corresponding memory block 2111, an output end T2 is connected to the bus 13, and a control end T3 is connected to the first controller 222. A first controller 222 is used for transmitting a turning-on signal to the switch module 221 when the memory block 2111 connected to the input end T1 needs to output image data; when the memory block 2111 connected to the input end T1 does not need to output image data, a turning-off signal is transmitted to the switch module 221. A switch module 221 for turning on under a turning-on signal; and turning off under the condition that the turning-off signal.

Through the interactive action of the switch module 221 and the first controller 222, each transmission line 22 is turned on only when data is transmitted at the image data output time point of the memory block 2111 to which it is correspondingly connected, and is kept off at other times, so that transmission collision of the image data transmitted on the bus can be prevented.

The specific type of switch module 221 is not limited by the embodiments of the present application, and may be specifically selected based on service requirements. Illustratively, switch module 221 is a tri-state buffer or MOS tube.

The switch module 221 is a tri-state buffer. The switch module 211 shown in FIG. 8 is a tri-state buffer. When the input end T1 of the tri-state buffer corresponding to the connected memory block 2111 needs to output image data, the first controller 222 transmits a turning-on signal to the control end T3. Under the condition of a turning-on signal, the tri-state buffer is turned on, and the image data received at its input end T1 is sent directly to the output end T2 and transmitted to the bus 23. When the input end T1 of the tri-state buffer corresponding to the connected memory block 2111 does not need to output image data, the first controller 222 transmits a turning-off signal to the control end T3. Under the condition of a turning-off signal, the tri-state buffer is off, in a high impedance state, and its input end T1 always has its output in a high impedance state no matter what data is received.

Figure 9:
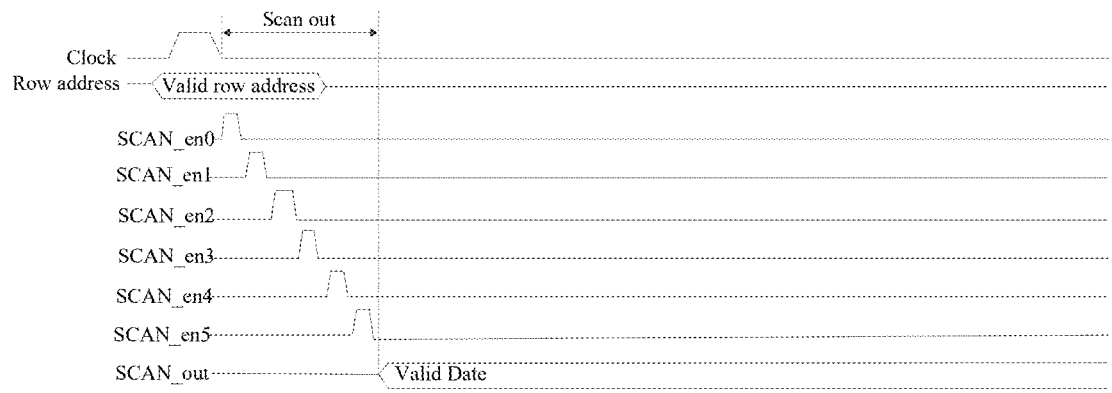
FIG. 9 shows a schematic diagram of a timing sequence according to an embodiment of the present application.

The interaction of the switch module 221 and the first controller 222 will now be described with reference to FIG. 8. After the first controller 222 determines the effective row address of the pixel row to be displayed based on the clock signal in FIG. 9, the first controller 222 transmits a turning-on signal and a turning-off signal to a tri-state buffer of SRAM #0 in "MACRO #0 to MACRO #7", SRAM #1 in "MACRO #0 to MACRO #7", SRAM #2 in "MACRO #0 to MACRO #7", SRAM #3 in "MACRO #0 to MACRO #7", SRAM #4 in "MACRO #0 to MACRO #7", and SRAM #5 in "MACRO #0 to MACRO #7" in FIG. 8 to realize that each tri-state buffer only transmits data on at the image data output time point of its corresponding connected memory block 2111, and remains off at other times, thereby being able to prevent transmission conflicts of image data transmitted on the bus. At the expiration of the time of the scan out, the scan for the memory block 2111 ends. The SCAN_out in FIG. 9 indicates that the scan ends to output valid data, which refers to the image data output from each of the memory blocks 2111, i.e. the image data corresponding to the valid row address of the pixel row to be displayed.

The switch module 221 is an MOS tube. When the memory block 2111 to which the input end T1 of the MOS tube is correspondingly connected needs to output image data, the first controller 222 transmits a turning-on signal to the control end T3. Under the condition of the turning-on signal, the MOS tube is turned on, and the image data received at its input end T1 is directly transmitted to the output end T2 which transmits the image data to the bus 23. When the memory block 2111 to which the input end T1 of the MOS tube is correspondingly connected does not need to output image data, the first controller 222 transmits a turning-off signal to the control end. Under the condition of a turning-off signal, the MOS tube is in the OFF state. When the switch module 221 is an MOS tube, the specific connection relationship thereof is determined according to the selected type of the MOS tube, which will not be described in detail here.

It should be noted that the particular type of the first controller 222 used in the present embodiment is not limited, and that the frame memory controller 112 shown in FIG. 1 of the present embodiment can be reused.

Bus 23:

In order to reduce the number of wirings, all the transmission lines 22 multiplex the same bus 23 and are connected to the same bus 23. The bus 23 is used for transmission processing of image data transmitted by the transmission line 22.

As shown in FIG. 1, the process of the bus 23 performing transmission processing on image data may be: the image data is transmitted to the decoder 114. The decoder 114 performs decoding processing on the image data, and transmits the decoded image data to the data processor 115. The image processor 115 processes the received image data to restore image quality or the like, and transmits the processed image data to the timing controller 116. Timing controller 116 generates a clock for the image data and transmits same to a register 117. The shift register 117 stores the image data based on its clock.

Embodiments of the present application provide a display driver integrated circuit including a bus, a static random-access memory divided into a plurality of memory areas, and a plurality of transmission lines connected to the bus. Each memory area is divided into at least two memory blocks. Each transmission line is respectively connected to a plurality of memory blocks in a corresponding manner, and the memory blocks connected to each transmission line are not repeated. It can be seen that the embodiments of the present application have at least the following two beneficial effects: firstly, by means that each transmission line is respectively connected to a plurality of memory blocks in a corresponding manner, and all the transmission lines are connected to a bus, not only multiple memory blocks reuse the same transmission line, but also all the transmission lines reuse the same bus, and therefore the solution provided by the embodiments of the present application can reduce the number of lines in a display driver integrated circuit, optimize the wiring structure of the display driver integrated circuit, and can leave a sufficient placement area for a static random-access memory. Secondly, the static random-access memory is divided into a plurality of memory areas, and each memory area is divided into at least two memory blocks, so that the writing and outputting of image data in units of memory blocks can be realized, and the writing and outputting speed of image data can be improved.

Figure 10:
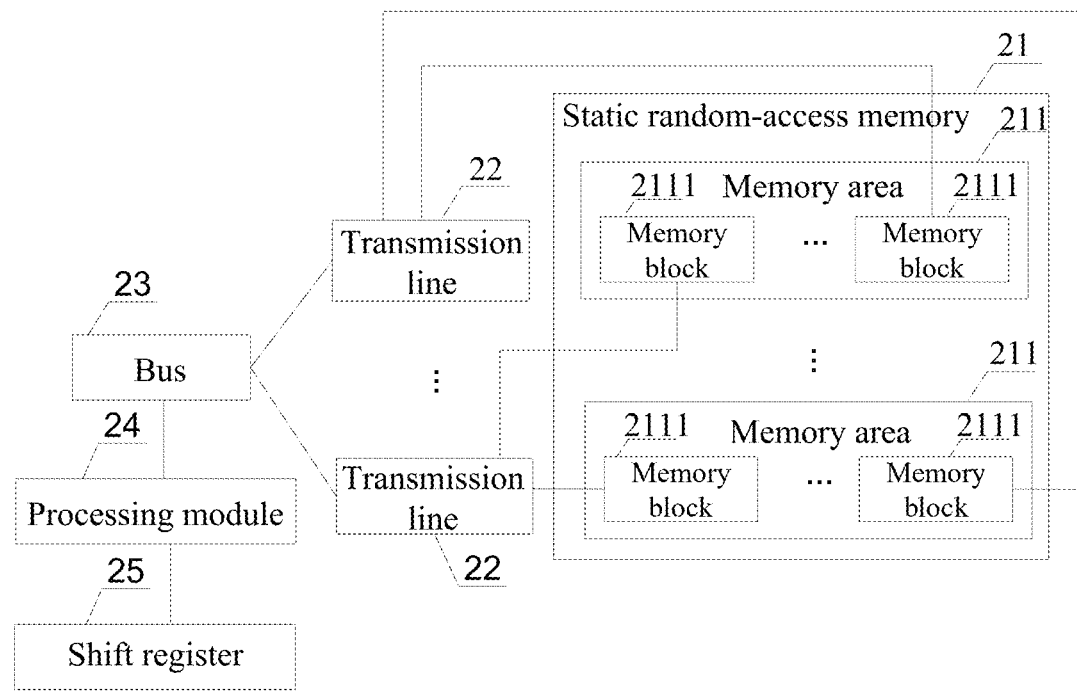
FIG. 10 shows a schematic diagram of a display driver integrated circuit according to a further embodiment of the present application.

Further, another embodiment of the present application also provides a display driver integrated circuit, as shown in FIG. 10, which includes a shift register 24 and a third controller 25 in addition to the static random-access memory 21, the transmission line 22, and the bus 23 shown in FIG. 4. The specific structures and interactions of the shift register 24 and the third controller 25 are described in detail below:

Processing Module 24 and Shift Register 25:

In order to reduce the number of wirings, all the transmission lines 22 multiplex the same bus 23 and are connected to the same bus 23. The bus 23 is used for transmission processing of image data transmitted by the transmission line 22. The bus 23 performs transmission processing on the image data transmitted by the transmission line 22, in essence, the image data is transmitted to the processing module 25 for the processing module 25 to process the image data, and the processed image data is transmitted to the shift register 26 for storage.

A processing module 25 for receiving image data transmitted by the bus 23 and processing the image data, and transmitting the processed data to the shift register 26.

The processing module 25 may be comprised of a decoder 114, a data processing module 115, and a timing controller 116 in FIG. 1. The decoder 114 performs decoding processing on the image data, and transmits the decoded image data to the data processor 115. The image processor 115 processes the received image data to restore image quality or the like, and transmits the processed image data to the timing controller 116. The timing controller 116 generates a clock for the image data and transmits same to the shift register 117. The shift register 26 stores the data processed by the processing module 25 based on the display timing of the image data at the corresponding pixel unit. In order to ensure that the pixel unit can be displayed at the correct time, the shift register 26 stores the data processed by the processing module 25 based on the display timing of the image data at the corresponding pixel unit so as to provide the image data to the pixel unit for display at the correct time.

Further, another embodiment of the present application also provides a control method for a display driver integrated circuit, wherein the control method for the display driver integrated circuit is applied to the above-mentioned display driver integrated circuit, and as shown in FIG. 11, the control method for the display driver integrated circuit mainly includes the following steps 301 and 302:

301, traversing the memory blocks in the static random-access memory based on a second ordering when a line of pixels to be displayed needs to be scanned, wherein the number of consecutive orderings of the memory blocks belonging to the same memory area in the second ordering is not greater than a second number, and the second number is a positive integer greater than or equal to 1. The static random-access memory 21 includes memory blocks 2111 having a second ordering that defines an image data output order of the memory blocks 2111 in the static random-access memory 21. There are two setting principles for the second ordering: firstly, since the pixel units in the pixel lines to be displayed are scanned one by one, the image data output order of the memory blocks defined by the second ordering needs to be the same as the scanning order of the pixel units one by one to ensure that the pixel units can be applied to their corresponding image data when the pixel units are scanned. That is, the position of the memory blocks in the second ordering should be set to ensure that the pixel units are scanned in order to avoid confusion in pixel unit scanning. Secondly, a plurality of memory blocks within one memory area continuously output image data, which may cause excessive power consumption and result in a decrease in the output speed of image data; therefore, in order to avoid the occurrence of a decrease in the output speed of image data, in the second ordering, the number of memory blocks 2111 belonging to the same memory area 211 in the second ordering is not greater than the second number in a continuous ordering. The particular value of the second number is not limiting and may be selected based on business requirements. Illustratively, the second number is 1, i.e. any two adjacent memory blocks 2111 in the second ordering do not belong to the same memory area. Illustratively, if the second number is 2, then in the second ordering, it does not occur that three memory blocks 2111 which are adjacent in success belong to the same memory area, and it can only occur that two adjacent memory blocks 2111 belong to the same memory area.

Based on the setting principle of the above-mentioned second ordering, there are two set second orderings:

firstly, in the case where the second number is 1 and the memory blocks 2111 in the same memory area 211 have a target order, the second ordering is formed by concatenating a plurality of third orders. All the third orderings cover all the memory blocks 2111 in the static random-access memory 21, and the memory blocks 2111 in different third ordering are not repeated. Each third ordering is respectively composed of memory blocks 2111 having the same ordering position in the target ordering corresponding to each memory area 211, and the memory blocks 2111 involved in the third ordering are all ordered according to the traversal order of each memory area 211.

The second ordering is formed by concatenating a plurality of third ordering, and the third ordering is constructed according to the target ordering corresponding to each memory area 211. The target ordering, the third ordering and the second ordering are described below, respectively.

The target ordering is the ordering of the memory blocks 2111 within the same memory area 211, which defines the order in which each of the memory blocks 2111 within the same memory area 211 transmits image data. Illustratively, as shown in FIG. 5, the memory blocks 2111 in each memory area 211 all have the same target ordering, and the order of each of the memory blocks 2111 in the target ordering is: SRAM #0, SRAM #1, SRAM #2, SRAM #3, SRAM #4, and SRAM #5. Each memory area 211 has its own corresponding target ordering. These target orderings are the basis for setting the third ordering.

Each third ordering is respectively used for performing a traversal on a memory area 211 included in the static random-access memory 21, and defines a traversal order of memory blocks 211 needing to be traversed in each memory area 211 under the current traversal. Since the value of the second number is 1, the principle used for setting the third ordering is: the memory blocks 2111 having the same ordering position in the target ordering corresponding to each memory area 211 are composed into a third ordering, and the memory blocks 2111 in the composed third ordering are ordered according to the traversal order of each memory area 211.

Illustratively, the memory blocks 2111 in each memory area 211 all have the same target ordering, and the order of each of the memory blocks 2111 in the target ordering is: SRAM #0, SRAM #1, SRAM #2, SRAM #3, SRAM #4, and SRAM #5. The SRAM #0 in each memory area 211 is located at the first position in the corresponding target ordering, and therefore the SRAM #0 in the memory areas 211 "MACRO #0 to MACRO #7" is constructed as a third ordering, and the SRAM #0 in the "MACRO #0 to MACRO #7" in the constructed third ordering is ordered according to the traversal order of the MACRO #0 to MACRO #7.

Illustratively, the memory blocks 2111 in each memory area 211 all have the same target ordering, and the order of each of the memory blocks 2111 in the target ordering is: SRAM #0, SRAM #1, SRAM #2, SRAM #3, SRAM #4, and SRAM #5. The SRAM #1 in each memory area 211 is located at the second position in the corresponding target ordering, and therefore the SRAM #1 in the memory areas 211 "MACRO #0 to MACRO #7" is constructed as a third ordering, and the SRAM #1 in the "MACRO #0 to MACRO #7" in the constructed third ordering is ordered according to the traversal order of the MACRO #0 to MACRO #7.

The third ordering set based on the above-mentioned third ordering setting principle covers all the memory blocks 2111 in the static random-access memory 21, and the memory blocks 2111 in different third orderings are not repeated.

Therefore, after a second ordering is formed according to these third ordering combinations, when the memory block 2111 in the static random-access memory 21 is traversed blocks 2111 in the static random-access memory 21 using the second ordering, there is neither a case where the memory blocks 2111 are omitted, nor a case where one memory block 2111 is executed for a plurality of data reading operations.

The set third ordering has a precedence order, and a second ordering is formed by splicing the third ordering based on the precedence order. The precedence of the third ordering is based on the position of the memory block in the third ordering in the corresponding target ordering. For example, if the memory block in one third ordering 1 is the memory block located at the first position in the target ordering, and the memory block in the other third ordering 2 is the memory block located at the second position in the target ordering, when the second ordering is concatenated, the order of the third ordering 1 is located before the third ordering 2.

Illustratively, a static random-access memory 21 is illustrated in FIG. 5. The second ordering shown in FIG. 12 is set for the static random-access memory 21 shown in FIG. 5. One column in FIG. 12 corresponds to a third ordering. A third ordering defines a traversal order of the memory areas 211 "MACRO #0, MACRO #1, MACRO #2, MACRO #3, MACRO #4, MACRO #5, MACRO #6 and MACRO #7", and defines a memory block 2111 needing to be traversed in MACRO #0, MACRO #1, MACRO #2, MACRO #3, MACRO #4, MACRO #5, MACRO #6 and MACRO #7 in each traversal. As can be seen from FIG. 11, in each third ordering, the memory blocks 2111 to be traversed in each memory area 211 are memory blocks 2111 of the same order number. For example, for the first column, the first memory block SRAM #0 in each memory area 211 is traversed successively in the order of MACRO #0, MACRO #1, MACRO #2, MACRO #3, MACRO #4, MACRO #5, MACRO #6 and MACRO #7, and a data reading operation is performed on the currently traversed memory block SRAM #0. After traversing SRAM #0 in MACRO #7, traversal for the second memory block SRAM #1 in each memory area 211 is continued in success according to the order of MACRO #0, MACRO #1, MACRO #2, MACRO #3, MACRO #4, MACRO #5, MACRO #6 and MACRO #7, and a data reading operation is performed on the currently traversed memory block SRAM #1. The above process is repeated and ends by traversing directly to the last memory block SRAM #5 in MACRO #7.

The output of the memory blocks 2111 included in the static random-access memory 21 according to the second ordering can not only ensure that the pixel units are scanned row by row and avoid confusion in pixel unit scanning, but also for a memory area, only one memory block is traversed at a time and only one memory block included therein outputs image data, thus avoiding continuous output of image data by the memory blocks in one memory area, thereby reducing the output loss of the memory area and further improving the output speed of image data.

Secondly, in the case where the second number is greater than 1, the second ordering is formed by concatenating a plurality of fourth orderings, all the fourth orderings cover all memory blocks in the static random-access memory, and the memory blocks in different fourth orderings are not repeated. Each fourth ordering is respectively used for defining a traversal order of a plurality of memory blocks, wherein the plurality of memory blocks relate to all memory areas of the static random-access memory, the plurality of memory blocks are ordered according to the traversal order of each memory area, the memory blocks belonging to the same memory area are ordered successively, and the total number of the memory blocks belonging to the same memory area is not greater than the second number.

The second ordering is formed by concatenating a plurality of fourth ordering. The fourth ordering and the second ordering are described below, respectively.

Each fourth ordering is respectively used for performing a traversal on a memory area 211 included in the static random-access memory 21, and defines a traversal order of memory blocks 211 needing to be traversed in each memory area 211 under the current traversal. Since the value of the second number is a value greater than 1, the principle used for setting the fourth ordering is: memory blocks 2111 participating in ordering are selected in each memory area 211, and the number of the selected memory blocks 2111 in the same memory area 211 is not greater than the second number; the memory blocks 2111 from the same memory area 211 are ordered; the ordered memory blocks 2111 are then ordered and concatenated according to the traversal order of each memory area 211 to form a fourth ordering.

Illustratively, the memory blocks 2111 in each memory area 211 all have the same target ordering, and the order of each of the memory blocks 2111 in the target ordering is: SRAM #0, SRAM #1, SRAM #2, SRAM #3, SRAM #4, and SRAM #5. The case where each memory area 211 selects a memory block 2111 participating in ordering is: the memory blocks 2111 "SRAM #0 and SRAM #1" are selected from the memory areas 211 "MACRO #0 to MACRO #7" to participate in the ordering, and the obtained fourth ordering is as shown in the first column of FIG. 13, which is: "MACRO #0, SRAM #0"", MACRO #0, SRAM #1", MACRO #1, SRAM #0", MACRO #1, SRAM #1", MACRO #2, SRAM #0", MACRO #2, SRAM #1", MACRO #3, SRAM #0", MACRO #3, SRAM #1", MACRO #4, SRAM #0", MACRO #4, SRAM #1", MACRO #5, SRAM #0", MACRO #5, SRAM #1", MACRO #6, SRAM #0", MACRO #6, SRAM #1", MACRO #7, SRAM #0", MACRO #7, SRAM #1". A fourth ordering corresponding to the second column and the third column shown in FIG. 13 is set according to the above-mentioned principle.

The fourth ordering set based on the above-mentioned fourth ordering setting principle covers all the memory blocks 2111 in the static random-access memory 21, and the memory blocks 2111 in different fourth orderings are not repeated. Therefore, after a second ordering is formed according to these fourth ordering combinations, when the memory block 2111 in the static random-access memory 21 is traversed blocks 2111 in the static random-access memory 21 using the second ordering, there is neither a case where the memory blocks 2111 are omitted, nor a case where one memory block 2111 is executed for a plurality of data reading operations.

The set fourth ordering has a precedence order, and a second ordering is formed by splicing the fourth ordering based on the precedence order. The precedence of the fourth ordering is based on the position of the memory block in the fourth ordering in the corresponding target ordering. For example, if the memory block in one fourth ordering 1 is the memory block located at the first position in the target ordering, and the memory block in the other fourth ordering 2 is the memory block located at the second position in the target ordering, when the second ordering is concatenated, the order of the fourth ordering 1 is located before the fourth ordering 2.

Figure 13:
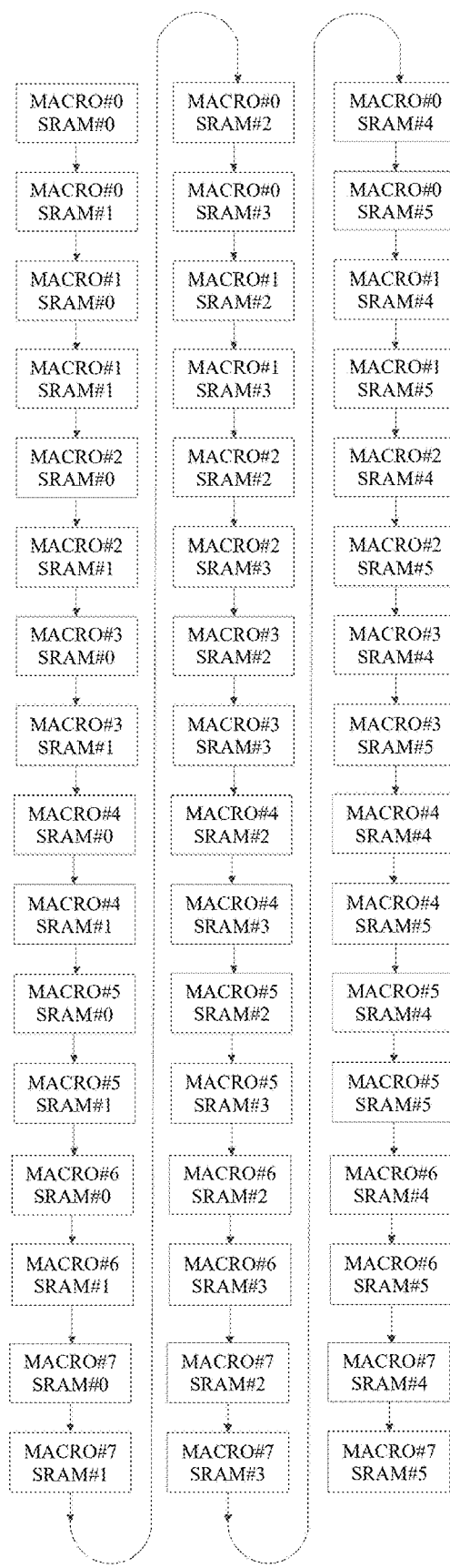
FIG. 13 illustrates a schematic diagram of a data output ordering according to another embodiment of the present application.

Illustratively, a second ordering as shown in FIG. 13 is set for the static random-access memory 21. One column in FIG. 13 corresponds to a fourth ordering. A fourth ordering defines a traversal order of the memory areas 211 "MACRO #0, MACRO #1, MACRO #2, MACRO #3, MACRO #4, MACRO #5, MACRO #6 and MACRO #7", and defines a memory block 2111 needing to be traversed in MACRO #0, MACRO #1, MACRO #2, MACRO #3, MACRO #4, MACRO #5, MACRO #6 and MACRO #7 in each traversal. It can be seen from FIG. 13 that in each fourth ordering, there are two memory blocks 2111 to be traversed in each memory area 211. For example, for the first column, the first memory block SRAM #0 and the second memory block SRAM #1 in each memory area 211 are traversed successively in the order of MACRO #0, MACRO #1, MACRO #2, MACRO #3, MACRO #4, MACRO #5, MACRO #6 and MACRO #7, and a data reading operation is performed on the currently traversed memory blocks. After traversing SRAM #0 and SRAM #1 in MACRO #7, traversal for the third memory block SRAM #2 and SRAM #3 in each memory area 211 is continued in success according to the order of MACRO #0, MACRO #1, MACRO #2, MACRO #3, MACRO #4, MACRO #5, MACRO #6 and MACRO #7, and a data read operation is performed on the currently traversed memory block. The above process is repeated and ends by traversing directly to the last memory block SRAM #5 in MACRO #7.

The output of the memory blocks 2111 included in the static random-access memory 21 according to the second ordering can not only ensure that the pixel units are scanned row by row to avoid confusion in the pixel unit scanning, but also limit the number of memory blocks of continuous output image data in one memory area, which is not greater than the second number to avoid the case where the output speed of image data decreases due to the increase of the output loss of the memory area.

302, performing a data reading operation on the currently traversed memory blocks, so that the currently traversed memory blocks transmit stored image data to correspondingly connected transmission lines.

The currently traversed memory block 2111 transmits the stored image data to the correspondingly connected transmission line 22 when a data reading operation is performed on currently traversed memory block 2111. The transmission line 22 is then turned on to transmit image data to the bus 23. The bus 23 performs transmission processing on the image data transmitted by the transmission line 22, i.e., the bus 23 transmits the image data to the processing module 25 for the processing module 25 to process the image data, and transmits the processed image data to the shift register 26 for storage. The shift register 26 supplies the corresponding image data to the pixel at a set timing, thereby completing the display output of the pixel unit.

According to a control method for a display driver integrated circuit according to an embodiment of the present application, when it is necessary to scan a pixel line to be displayed, traversing the memory blocks in the static random-access memory based on a second ordering, and performing a data reading operation on the currently traversed memory blocks, so that the currently traversed memory blocks transmit stored image data to correspondingly connected transmission lines. It can be known that continuously outputting image data from a plurality of memory blocks in one memory area would increase power consumption, resulting in a decrease in the output speed of image data; therefore, the embodiment of the present application controls the number of memory blocks continuously outputting image data in one memory area by controlling the number of consecutive memory blocks belonging to the same memory area in the second ordering, and therefore the embodiment of the present application can avoid the occurrence of a decrease in the output speed of image data.

Further, the control method of the display driver integrated circuit provided by the embodiment of the present application may further include the following step 303:

303, when image data storage needs to be performed on a pixel line to be displayed, traversing the memory blocks in the static random-access memory based on the second ordering, and performing a data write operation on the currently traversed memory blocks, so that the currently traversed memory blocks correspondingly store the written image data.

The image data stored in the static random-access memory 21 adopts a first-in first-out principle, and therefore when writing the image data to the memory block 2111, the memory block 2111 in the static random-access memory 21 can also be written according to the second ordering.

Illustratively, as shown in FIG. 12, the first memory block SRAM #0 in each memory area 211 is firstly traversed in an order of MACRO #0, MACRO #1, MACRO #2, MACRO #3, MACRO #4, MACRO #5, MACRO #6, and MACRO #7, and the corresponding image data is written in the currently traversed memory block 2111. After traversing SRAM #0 in MACRO #7, traverse for the second memory block SRAM #1 in each memory area 211 is continued in success according to the order of MACRO #0, MACRO #1, MACRO #2, MACRO #3, MACRO #4, MACRO #5, MACRO #6 and MACRO #7, and the corresponding image data is written in the currently traversed memory block 2111. The above process is repeated and ends by traversing directly to the last memory block SRAM #5 in MACRO #7. Note that the image data can be transmitted to the static random-access memory 21 through the write bus in FIG. 3.

The static random-access memory 21 includes memory blocks 2111 for writing image data in the second ordering, which not only ensures that the image data is written in a row-by-row scanning order of pixel units, but also limits the number of memory blocks in one memory area for writing image data consecutively, thereby avoiding a decrease in the writing speed of image data due to an increase in the writing loss of the memory area.

Further, according to the above embodiment, another embodiment of the present application also provides a frame memory controller applied to a display driver integrated circuit, and the frame memory controller applies the control method of the display driver integrated circuit as described above.

Illustratively, the frame memory controller provided by embodiments of the present application is the frame memory controller 112 shown in FIG. 1.

Advantageous effects of the frame memory controller applied to the display driver integrated circuit provided by the embodiments of the present application can be described with reference to the embodiments of the control method of the display driver integrated circuit described above, and will not be described in detail herein.

Further, according to the above-mentioned embodiment, another embodiment of the present application also provides a display apparatus including: a display driver integrated circuit as described above and a frame memory controller applied to the display driver integrated circuit as described above.

Advantageous effects of the display apparatus provided by the embodiments of the present application can be described with reference to the above-described embodiments of the display driver integrated circuit and the embodiments of the frame memory controller applied to the display driver integrated circuit, and will not be described in detail herein.

In the above-mentioned embodiments, the description of each embodiment has its own emphasis, and reference can be made to the description of described in detail can be referred to the description of other embodiments.

It will be understood that relative features of the methods and apparatus described above may be referred to one another. In addition, the terms "first", "second", and the like in the above-described embodiments are used to distinguish the various embodiments and do not represent the advantages or disadvantages of the various embodiments.

It will be clear to a person skilled in the art that, for the convenience and brevity of the description, specific working procedures of the above-described systems, devices and units may be referred to corresponding procedures in the preceding method embodiments and will not be described in detail here.

The algorithms and displays presented herein are not inherently related to any particular computer, virtual system, or other apparatus. Various general purpose systems may also be used with the teachings based herein. The structure required to construct such a system is apparent from the above description. Further, this application is not directed to any particular programming language. It should be understood that the subject matter described herein may be implemented using a variety of programming languages and that the description above of specific languages is for the purpose of disclosing the best mode of practicing the subject matter.

In the description provided herein, numerous specific details are set forth. However, it is understood that embodiments of the present application may be practiced without these specific details. In some instances, well-known methods, structures and techniques have not been shown in detail in order not to obscure the understanding of this description.

Moreover, a person skilled in the art will appreciate that although some embodiments described herein include some but not other features included in other embodiments, combinations of features of different embodiments are meant to be within the scope of the application and form different embodiments. For example, in the following claims, any one of the claimed embodiments may be used in any combination.

Various component embodiments of the present application may be implemented in hardware, or in a software module running on one or more processors, or in a combination thereof. It will be appreciated by a person skilled in the art that a microprocessor or digital signal processor (DSP) may be used in practice to implement some or all of the functions of some or all of the components of the display drive integrated circuit and its control method according to embodiments of the present application. The application can also be implemented as an apparatus or device program (e.g. a computer program and a computer program product) for performing some or all of the methods described herein. Such a program implementing the present application may be stored on a computer-readable medium, or may be in the form of one or more signals. Such signals may be downloaded from an Internet website, provided on a carrier signal, or provided in any other form. It should be noted that the above-mentioned embodiments illustrate rather than limit the application, and that a person skilled in the art will be able to design alternative embodiments without departing from the scope of the appended claims. In the claims, any reference signs placed between parentheses shall not be construed as limiting the claim. The word "including" does not exclude the presence of elements or steps other than those listed in a claim. The word "a" or "an" preceding an element does not exclude the presence of a plurality of such elements. The application can be implemented by means of hardware including several distinct elements, and by means of a suitably programmed computer. In the unit claims enumerating several means, several of these means can be embodied by one and the same item of hardware. The use of the words first, second, third, etc. does not denote any order. These words may be interpreted as names.

The invention claimed is:

1. A display driver integrated circuit, comprising: a bus, a static random-access memory divided into a plurality of memory areas, and a plurality of transmission lines connected to the bus; wherein each of the memory areas comprises at least two memory blocks; each of the transmission lines is respectively connected to a plurality of memory blocks in a corresponding manner, and the memory blocks connected to each of the transmission lines are not repeated;

the total amount of the transmission lines is a first number, and each of the memory areas comprises the first number of memory blocks; the memory blocks in the same memory area have a first ordering; the memory blocks having the same ordering position in the first ordering corresponding to each of the memory areas are correspondingly connected to the same transmission line; wherein the first ordering describes the order of output image data of each of the memory blocks in a corresponding memory area.

2. The display driver integrated circuit according to claim 1, wherein the transmission lines are turned on when the memory blocks connected thereto need to output image data, and transmit the image data to the bus; and are turned off when the memory blocks connected thereto do not need to output image data; and the bus is used for performing transmission processing on the image data.

3. The display driver integrated circuit according to claim 2, wherein the transmission lines comprise switch modules and first controllers; wherein an input end of the switch module is connected to a corresponding memory block, an output end is connected to the bus, and a control end is connected to the first controller;

the first controller is used for transmitting a turning-on signal to the switch module when a memory block connected to the input end needs to output image data; and transmitting a turning-off signal to the switch module when the memory block connected to the input end does not need to output image data; and the switch module is used for turning on under the condition of the turning-on signal; and turning off under the condition of the turning-off signal.

4. The display driver integrated circuit according to claim 3, wherein the switch module is a tri-state buffer or a Metal-Oxide-Semiconductor Field-Effect Transistor (MOS) tube.

5. The display driver integrated circuit according to claim 1, wherein the number of the transmission lines is the same as the total number of the memory areas; the memory blocks in the same memory area are correspondingly connected to the same transmission lines, and different memory areas correspond to different transmission lines.

6. The display driver integrated circuit according to claim 1, further comprising a processing module and a shift register;

wherein the processing module is used for receiving image data transmitted by the bus, processing the image data, and transmitting the processed data to the shift register; and the shift register is used for storing the processed data based on the display timing of the image data at the corresponding pixel unit.

7. A control method of a display driver integrated circuit, being applied to the display driver integrated circuit according to claim 1, and comprising:

when it is necessary to scan a pixel line to be displayed, traversing the memory blocks in the static random-access memory based on a second ordering, and performing a data reading operation on the currently traversed memory blocks, so that the currently traversed memory blocks transmit stored image data to correspondingly connected transmission lines;

wherein the number of consecutive orderings of the memory blocks belonging to the same memory area in the second ordering is not greater than a second number, and the second number is a positive integer greater than or equal to 1.

8. The method according to claim 7, further comprising: when image data storage needs to be performed on a pixel line to be displayed, traversing the memory blocks in the static random-access memory based on the second ordering, and performing a data write operation on the currently traversed memory blocks, so that the currently traversed memory blocks correspondingly store the written image data.

9. The method according to claim 8, wherein in the case where the second number is 1 and the memory blocks in the same memory area have a target ordering, the second ordering is formed by concatenating a plurality of third orderings; all the third orderings cover all the memory blocks in the static random-access memory, and the memory blocks in different third orderings are not repeated; each of the third orderings is respectively composed of memory blocks having the same ordering position in the target ordering corresponding to each of the memory areas, and the memory blocks involved in the third orderings are sorted according to the traversal order of each of the memory areas.

10. The method according to claim 8, wherein in the case where the second number is greater than 1, the second ordering is formed by concatenating a plurality of fourth orderings, all the fourth orderings cover all the memory blocks in the static random-access memory, and the memory blocks in different fourth orderings are not repeated; each of the fourth orderings is respectively used for defining a traversal order of a plurality of memory blocks; wherein the plurality of memory blocks relate to all memory areas of the static random-access memory, the plurality of memory blocks are ordered according to a traversal order of each of the memory areas, and the memory blocks belonging to the same memory area are ordered successively, and the total number of the memory blocks belonging to the same memory area is not greater than the second number.

11. The method according to claim 7, wherein in the case where the second number is 1 and the memory blocks in the same memory area have a target ordering, the second ordering is formed by concatenating a plurality of third orderings; all the third orderings cover all the memory blocks in the static random-access memory, and the memory blocks in different third orderings are not repeated; each of the third orderings is respectively composed of memory blocks having the same ordering position in the target ordering corresponding to each of the memory areas, and the memory blocks involved in the third orderings are ordered according to the traversal order of each of the memory areas.

12. The method according to claim 7, wherein in the case where the second number is greater than 1, the second ordering is formed by concatenating a plurality of fourth orderings, all the fourth orderings cover all the memory blocks in the static random-access memory, and the memory blocks in different fourth orderings are not repeated; each of the fourth orderings is respectively used for defining a traversal order of a plurality of memory blocks; wherein the plurality of memory blocks relate to all memory areas of the static random-access memory, the plurality of memory blocks are ordered according to a traversal order of each of the memory areas, and the memory blocks belonging to the same memory area are ordered successively, and the total number of the memory blocks belonging to the same memory area is not greater than the second number.

13. The method according to claim 7, wherein the transmission lines comprised by the display drive integrated circuit are turned on when the memory blocks connected thereto need to output image data, and transmit the image data to a bus comprised in the display drive integrated circuit, and are turned off when the storage blocks connected thereto do not need to output image data; and the bus is used for performing transmission processing on the image data.

14. The method according to claim 13, wherein the transmission lines comprised by the display driver integrated circuit comprises a switch module and a first controller; wherein an input end of the switch module is connected to a corresponding memory block, an output end is connected to the bus, and a control end is connected to the first controller;
the first controller is used for transmitting a turning-on signal to the switch module when a memory block connected to the input end needs to output image data; and transmitting a turning-off signal to the switch module when the memory block connected to the input end does not need to output image data; and
the switch module is used for turning on under the condition of the turning-on signal; and turning off under the condition of the turning-off signal.

15. The method according to claim 7, wherein the total amount of the transmission lines comprised by the display driver integrated circuit is a first number, and each of the memory areas comprises the first number of memory blocks; the memory blocks in the same memory area have a first ordering; the memory blocks having the same ordering position in the first ordering corresponding to each of the memory areas are correspondingly connected to the same transmission line; wherein the first ordering describes the order of output image data of each of the memory blocks in a corresponding memory area.

16. The method according to claim 7, wherein the number of the transmission lines comprised by the display driver integrated circuit is the same as the total number of the memory areas; the memory blocks in the same memory area are correspondingly connected to the same transmission lines, and different memory areas correspond to different transmission lines.

17. The method according to claim 7, wherein the display driver integrated circuit further comprises a processing module and a shift register;
the processing module is used for receiving image data transmitted by the bus, processing the image data, and transmitting the processed data to the shift register; and
the shift register is used for storing the processed data based on the display timing of the image data at the corresponding pixel unit.

18. A frame memory controller applied to a display driver integrated circuit, wherein the frame memory controller applies the control method of the display driver integrated circuit according to claim 7.

19. A display apparatus, comprising: the display driver integrated circuit according to claim 1 and the frame memory controller applied to a display driver integrated circuit according to claim 18.

* * * * *